United States Patent [19]

Strelow

[11] Patent Number: 5,631,634
[45] Date of Patent: May 20, 1997

[54] FLOW AND PRESSURE SENSOR

[75] Inventor: John Strelow, Broken Arrow, Okla.

[73] Assignee: Oklahoma Safety Equipment Co., Broken Arrow, Okla.

[21] Appl. No.: 371,427

[22] Filed: Jan. 11, 1995

[51] Int. Cl.$^6$ .................................................. G08B 21/00
[52] U.S. Cl. .................. 340/626; 340/610; 340/611; 200/61.08; 137/68.11; 137/68.18; 137/68.19; 137/68.27; 137/68.28
[58] Field of Search .................................. 340/626, 610, 340/611; 200/81 R, 61.08; 137/67, 68, 68.11, 68.18, 68.19, 68.27, 68.28, 554, 557

[56] References Cited

U.S. PATENT DOCUMENTS

| Re. 34,308 | 7/1993 | Thompson et al. | 340/679 |
|---|---|---|---|
| 3,770,918 | 11/1973 | Fortmann | 200/61.08 |
| 4,270,660 | 6/1981 | Kearney | 137/68.11 |
| 4,342,988 | 8/1982 | Thompson et al. | 340/679 |
| 4,408,194 | 10/1983 | Thompson | 340/626 |
| 4,951,697 | 8/1990 | Fritts | 137/68.1 |
| 4,978,947 | 12/1990 | Finnegan | 340/611 |
| 5,155,471 | 10/1992 | Ellis et al. | 340/611 |
| 5,313,194 | 5/1994 | Varos | 340/626 |

Primary Examiner—Jeffery Hofsass
Assistant Examiner—Julie B. Lieu
Attorney, Agent, or Firm—Jones, Day, Reavis & Pogue

[57] ABSTRACT

A pressure sensor assembly includes a disk entirely of metal and having a plurality of circumferentially spaced petals, separated by a plurality of radially extending slots. The slots extend from the periphery of the disk to a position near the center. However, the disks are in electrical communication with one another. A pair of wire leads are respectively placed at terminals on two separate spaced-apart disks with the opposite end portion of the leads connected to an alarm monitor. The disk body can be used in low or high temperature applications and is corrosion resistant and preferably entirely metallic (for example, stainless steel). The disk body is designed to be installed between standard pipe flanges, between a flange and a rupture disk holder, or in a holder that is used as, or located downstream of, a rupture disk or similar device. The device is designed to cause a discontinuity (open circuit) in an electrical circuit as a result of fluid flow through the pipe. When a rupture disk or similar device bursts or a valve leaks, the resulting pressure charge will rupture (tear) the subject burst sensor creating an open circuit. The device may be of any metal with electrical conductivity compatible with an alarm system that is commercially available. The device may be domed and self-supporting. The all-metal sensor, and nonmetallic gasket provide an assembly that is more rugged, reliable, and economical than current designs and is reliable over a large range of temperatures. The apparatus of the present invention is nonfragmenting, which permits use under valves and applications where fragmentation presents a problem.

26 Claims, 2 Drawing Sheets

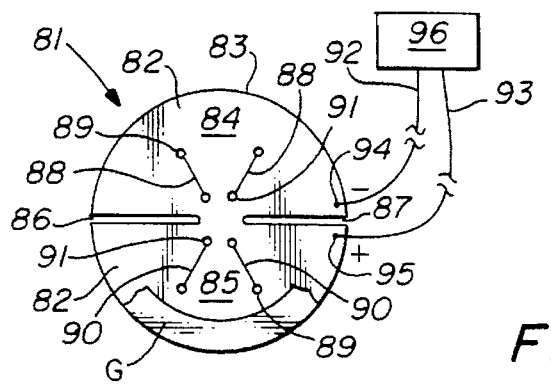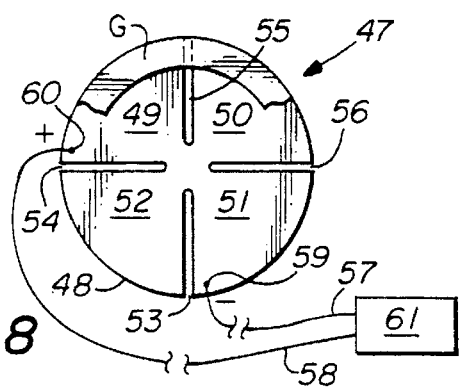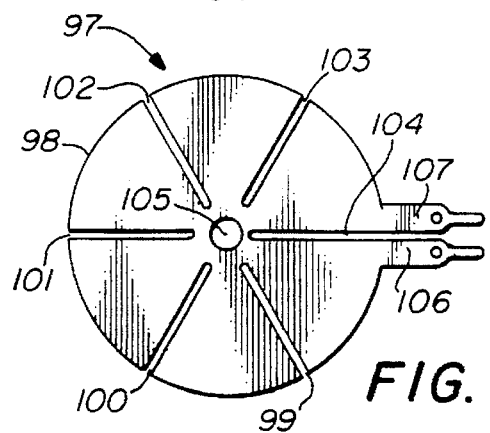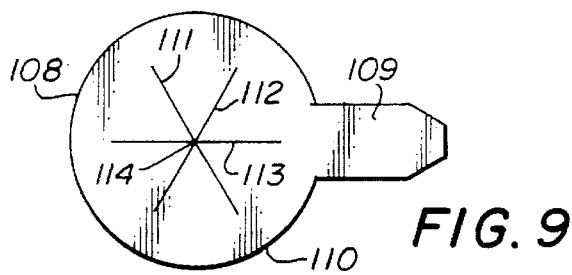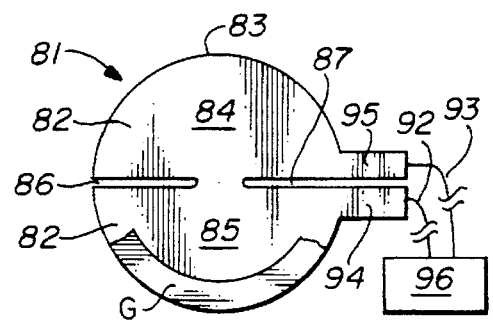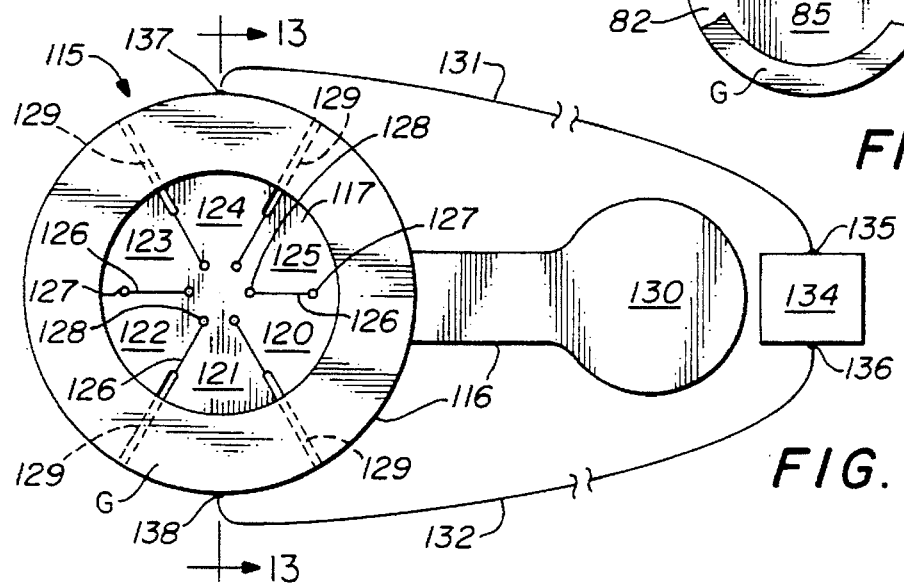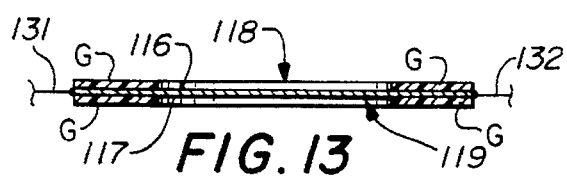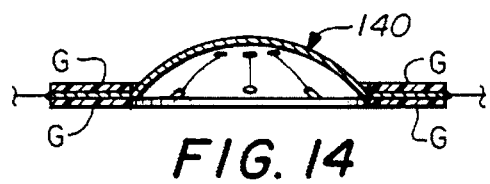

FLOW AND PRESSURE SENSOR

BACKGROUND OF THE INVENTION

1. Field of the Invention

The present invention relates generally to pressure sensors used in a fluid conduit to sense an increase in a predetermined flow rate or is used with a rupture disk or other fluid flow control device (such as a valve) and specifically relates to a metallic pressure sensor comprised of at least one petal for use in low and high temperature applications and that causes a discontinuity (open circuit) in an electrical circuit as a result of predetermined pressure differential across the sensor.

2. General Background

Rupture disk are commonly used in piping systems and on pressure vessels to quickly relieve pressure within the vessel or system in order to prevent damage to the vessel or to equipment associated with the vessel.

Typically, rupture disks are positioned in a piping system between standard pipe fittings such as flanges or are operatively coupled to a closed fluid container in which pressure can build. When a rupture disk breaks as a result of excess fluid pressure, an indication that such breaking has occurred is desirable in many situations.

Sensors have been patented that are directed to the concept of monitoring a rupture disk and indicating when that rupture disk has broken. Examples of such systems can be found in U.S. Pat. No. 3,770,918 issued Nov. 6, 1979; U.S. Pat. No. 4,342,988 issued Aug. 3, 1982; U.S. Pat. No. 4,408,194 issued Oct. 4, 1983; and U.S. Pat. No. 4,978,947 issued Dec. 18, 1990. Further, Sensors are commonly used to indicate when there is fluid flow or pressure buildup. For example, pressures increase in a storage tank.

The '947 patent discloses a sensor and a rupture disk assembly. The sensor is comprised of a rupturable member adapted to be clamped across a fluid flow passageway and having at least one opening formed therein for weakening a portion of the sensor. An electric current conductor adapted to be electrically connected in an alarm circuit is positioned across the weakened portion of the sensor rupturable member whereby, when the member ruptures as a result of fluid pressure exerted thereon, the conductor also ruptures to cause an alarm.

The Fritz U.S. Pat. No. 4,951,697 entitled "Rupture Disk Failure Indicating Apparatus" provides apparatus for visually indicating the failure of a rupture disk comprised of an elongated hollow body member, a piston disposed in the body member which is moved therein by pressurized fluid pressure exerted thereon, and an elongated indicator pin which is pushed by the piston through an opening in the body when pressurized fluid causes the piston to move therein. The body member includes a pressurized fluid exhaust port which is opened by the movement of the piston. Pressurized fluid exhausted through the exhaust port can be vented to prevent abnormal rupture disk operation or it can be utilized to activate an alarm.

GENERAL DISCUSSION OF THE PRESENT INVENTION

The present invention provides an improved flow and pressure sensor assembly that provides an immediate indication of an increase in fluid flow rate in a fluid conduit such as a pipe above a predetermined level. It also provides an indication when a flow control member (such as a valve) opens or when a rupture disk in an assembly ruptures. The sensor assembly includes a metallic disk or plate, entirely electrically conductive and having at least two circumferentially spaced petals, partially separated by at least two radially extending slots where a bridge portion connects the two slots. The slots extend from the periphery of the disk to a position near the center. However, the petals are normally in electrical communication with one another through the bridge portion.

A pair of wire leads have one end of each lead respectively coupled to terminals on the two separate spaced-apart petals separated by the bridge portion and the opposite end portion of each of the leads is connected to an alarm monitor. The sensor body can be used in low or high temperature applications, is corrosion resistant, and is preferably metallic (for example, stainless steel).

The sensor body in one application is designed to be installed between standard pipe flanges for monitoring fluid flow in a pipe or, in another application, is placed between a flange and a rupture disk holder. The device is designed to cause an electrical continuity (closed circuit) in an electrical circuit path as a result of normal fluid flow through the pipe. When an abnormal fluid flow rate occurs or when a rupture disk or similar device bursts, the resulting pressure differential across the sensor body will rupture (tear) the sensor body thereby creating an open electrical circuit path. The device may be of any metal with electrical conductivity compatible with an alarm system that is commercially available. The sensor body may be flat or domed and self supporting. The all-metal sensor body, with a nonmetallic insulating gasket on each side thereof, provides an assembly that is more rugged, reliable, and economical than existing designs and is reliable over a large range of temperatures. Since it is symmetrically constructed, the sensor does not have to be mounted in a particular orientation with respect to a "top" side or "bottom side. The apparatus of the present invention is nonfragmenting, which permits use under valves and in applications where fragmentation presents a problem.

The sensor body may be a plate that provides a peripheral edge portion and a plurality of circumferentially spaced disk petals separated by radially extending slots.

A sensor support structure is provided for holding the conductive sensor in operative relationship with a fluid containing vessel during use.

Insulation in the form of a pair of spaced apart annular gaskets is placed on the upper and lower surfaces of the sensor peripheral portion for preventing flow of electricity from the conductive sensor to the metallic support structure. The conductive sensor plate is preferably totally metallic.

A circuit includes a pair of electrical conductors extending respectively to a spaced-apart pair of the electrically connected tabs or petals. An alarm is provided for indicating that the connection between the electrically connected tabs or petals has broken, interrupting the circuit.

In the preferred embodiment, the sensor body or plate can be either generally flat or have a domed shape. The sensor body can have a generally concave-convex shape, including concave and convex sides either of which can be upstream or downstream.

In the preferred embodiment, the metallic support structure comprises a pair of pipe flanges. The conductive sensor body can have one or more petals including three, four, or six as examples only.

The sensor body may have a central opening therein with petals separated by slots that extend along radial lines beginning at a spaced distance from the central opening to the outer periphery of the sensor body.

The sensor body further comprises a pair of conductive tabs that extend beyond the periphery of the sensor body away from the gaskets for connection to the alarm circuit.

BRIEF DESCRIPTION OF THE DRAWINGS

These and other features of the present invention will be more fully disclosed in the following DETAILED DESCRIPTION OF THE DRAWINGS in which like numerals represent like elements and in which:

FIG. 7 is a plan view of a fifth embodiment of the apparatus of the present invention;

FIG. 8 is a plan view of a sixth embodiment of the apparatus of the present invention;

FIGS. 9–10 are plan views of a gasket and its seventh embodiment of the apparatus of the present invention;

FIG. 11 is a plan view of an eighth embodiment of the apparatus of the present invention;

FIG. 12 is a plan view of a tenth embodiment of the apparatus of the present invention;

FIG. 13 is a sectional view taken along lines 13—13 of FIG. 12; and

FIG. 14 is a general cross-sectional view of a dome shaped sensor of the present invention.

DETAILED DESCRIPTION OF THE PREFERRED EMBODIMENT

Figure 1:
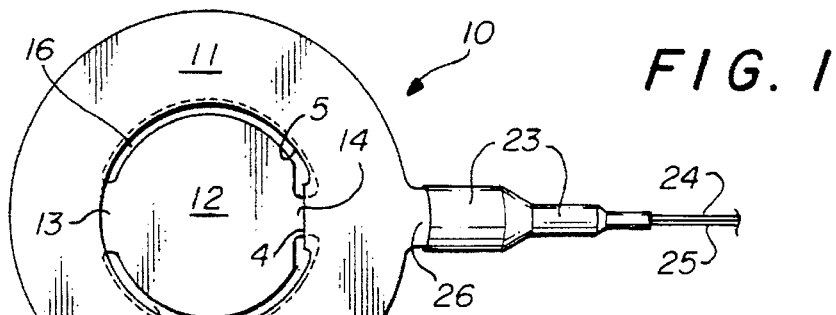
FIG. 1 is a plan view of the embodiment of the apparatus of the present invention.
Figure 2A:
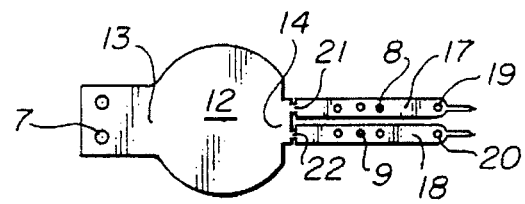
FIG. 2A is a partial plan view of the preferred embodiment of the apparatus of the present invention.
Figure 2B:
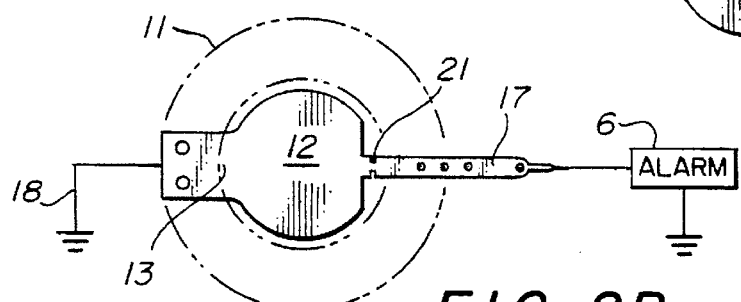
FIG. 2B is a partial plan view of an alternate construction of the preferred embodiment of the present invention.
Figure 3:
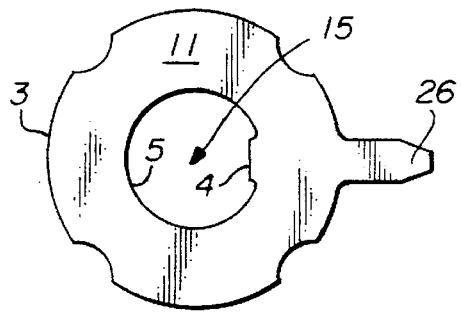
FIG. 3 is a plan view of a gasket used with the preferred embodiment of the apparatus of the present invention.

In the preferred embodiment of the FIGS. 1, 2A and 2B, a flow and pressure sensor is designated generally by the numeral 10. Sensor 10 includes a pair of nonconductive outer gasket sheets 11 shown in detail in FIG. 3 and a central circular metallic plate portion 12 shown in detail in FIG. 2, The metallic plate portion 12 has connective flanges 13, 14 for receiving the opposing gaskets 11. The pair of nonconducting gaskets 11 sandwich metallic plate flanges 13 and 14 therebetween. Each gasket (FIG. 3) is "donut" shaped or an annulus having an open center 15, an inner diameter 5 and also an outer diameter 3 as shown, and a projection or tab 26 that engages and is inserted in sheath 23 as shown in FIG. 1.

Figure 4:
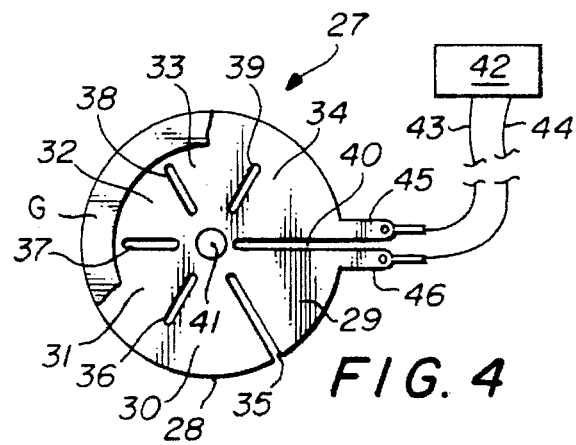
FIG. 4 is a plan view of a second embodiment of the apparatus of the present invention.

A pair of arcuate slots 16 form separations between the metallic plate 12 and gaskets 11 because the inner diameter of the insulating annulus is greater than the outer diameter of the sensor plate. The metallic plate portion 12 connects at portion 14 wire leads 24, 25 that connect to an electrical circuit with an alarm 42 as shown in FIG. 4. Connective portion 14 communicates with metal tabs 17, 18, each defining a terminal as shown in FIG. 2A for connecting to wire leads 24, 25 that connect to the electrical circuit with an alarm. Connective portion 14 communicates with metal tabs 17, 18, each defining a terminal for connecting to wire leads 24, 25 that extend from the alarm. Openings 19, 20 provide attachments for respective positive (+) and negative (−) wire leads 24 and 25. Terminals 17, 18 each have a first width and are connected to plate 12 with second reduced width sections 21, 22, respectively, or bridge portions that define the burst pressure for apparatus 10. Since the bridge portions could also be made thinner than the terminals 17, 18 to achieve the weakened portion, the term "width" as used herein to define a bridge portion, or weakened area, is intended to also include the term "thin". To lower the burst pressure, the sections 21, 22 are made thinner and/or of narrower width to form the weakened area and therefore break at lower pressures. Wire leads 24 and 25 are connected at spaced-apart positions from each other to openings 19, 20 and are carried within wire harness 23. The two wire leads 24, 25 are shown aligned side-by-side and parallel within harness 23 in FIG. 1.

When the plate 12 is subjected to a predetermined pressure differential across the plate, as when an upstream disk ruptures or a valve opens or flow rate increases excessively, the plate 12 breaks away from the terminals 17 and 18 by breaking either or both of the second thin or reduced width portions 21, 22 and interrupting an electrical circuit to sound an alarm in a well-known manner. The alarm and wire leads can be wired as shown for the embodiments of FIG. 4. Gaskets 11 are placed above and below plate 12 sandwiching the plate 12 therebetween and being held to plate 12 with adhesive, for example. In addition, flange 13 has orifices 7 and terminals 17 and 18 have orifices 8 and 9, respectively, therein for assisting in holding the gaskets 11 firmly to the sensor 10. Gasket material is forced into the orifices 7, 8, and 9 to prevent movement of the flange 13 and terminals 17 and 18 with respect to the gaskets 11. The gaskets 11 can have tabs 26 that extend into harness 23 upon assembly to shield and protect terminals 17 and 18 and a portion 4 extending inwardly from inner diameter 5 to cover weakened bridge portions 21 and 22. The inwardly extending gasket portion 4 prevents plate 12, when it breaks away from terminals 17 and 18, from accidentally electrically reconnecting with the broken portion of at least one of the first and second terminals 17 and 18.

In the embodiment shown in FIG. 2B, only one electrical terminal 17 has a weakened portion or bridge 21. The tab 13 has a ground means such as a wire or a rivet 18 attached thereto. Then, a closed electrical circuit or path is formed with the one terminal 17, the plate 12, tab 13 and ground wire 18 and back to alarm 6.

In the embodiment of FIG. 4, the flow and pressure sensor is designated generally by the numeral 27. Sensor 27 includes metal plate 28 having petals 29–34 separated by radial slots 35–40. A central opening 41 is radially spaced from the slots 35–40. The space between the slots 35–40 and central opening 41 form weakened portions or conductive bridge portions. Adjacent petals 29 and 34 are separated by slot 40 that has a shorter distance or space between the end thereof and the central opening 41 as can be seen in FIGS. 4 and 10. Wire leads 43, 44 conduct electricity between alarm 42 and terminals 45, 46 through a circuit path including metal plate 28. When a predetermined pressure differential across plate 28 is caused by excess flow rate and/or a pressure increase in a chamber, plate 28 is broken along a line including the weakened portion or bridge that connects slots 35 and 40 with central opening 41 or with the slot 40, interrupting an electrical circuit path formed by the plate 28, lines 43, 44, and alarm 42. Gaskets G (shown in partial view) hold the sensor 27 in a similar manner to that explained earlier.

Figure 5:
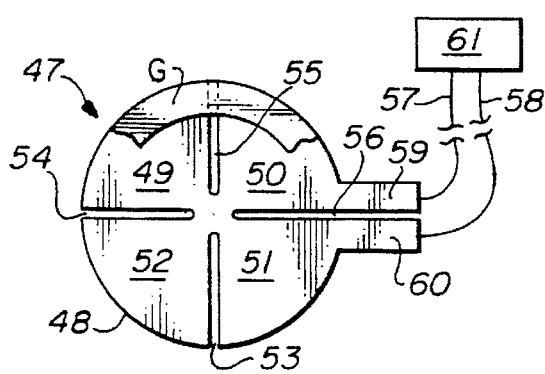
FIG. 5 is a plan view of a third embodiment of the apparatus of the present invention.

In the embodiment of FIGS. 5 and 8, the sensor apparatus is designated generally by the numeral 47. Sensor apparatus 47 provides a metal plate or sheet 48 formed of four petals 49–52 and a plurality of spaced-apart slots 53–56 radially extending inwardly from the periphery of plate 48. A pair of wire leads 57, 58 extend from terminals 59, 60, respectively, connecting the leads 57, 58 to the plate or sheet 48 at spaced-apart locations and at different petals 50 and 51 in FIG. 5 and at petals 49 and 41 in FIG. 8. When pressure ruptures the plate 48 between petals 50 and 51, a flow of electricity from terminal 59 to terminal 60 is interrupted allowing the alarm 61 to be activated by such interruption of the electrical circuit. In FIG. 5, sensor apparatus 47 carries a pair of integrally connected tabs as terminals 59, 60. In FIG. 8, the terminals 59, 60 are on the periphery of plate 48 on petals 49 and 51. When pressure ruptures the plate between petals 49 and 51, the electrical flow path is interrupted and the alarm 61 sounds or is activated.

Figure 6:
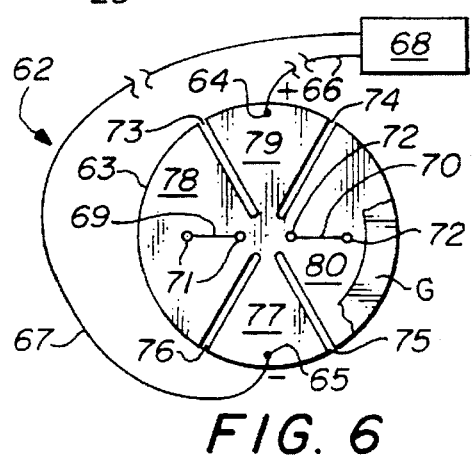
FIG. 6 is a plan view of a fourth embodiment of the apparatus of the present invention.

In the embodiment of FIG. 6, designated generally by the numeral 62, there is provided a metal plate 63 that is formed of two sets of opposing petal members 77–80 of two different sizes and separated, respectively, by four unequally spaced slots 73–76. The plate 63 also has scores 69, 70 with end openings 71, 72. The plate 63 is sandwiched between a pair of donut shaped gaskets G (shown in partial view only) in the form of an annulus. Thus gaskets G are provided above and below the plate 63 as with the embodiment of FIGS. 1 and 2. Alarm 68 is attached by means of wire leads 66, 67 and terminals 64, 65 to opposing petals 77 and 79 of plate 63 and to alarm 68, thereby forming a completed, or closed, electrical circuit. When the apparatus 62 is placed in a fluid flow stream, it forms a blockage to substantial fluid flow. When an upstream flow control device such as a rupture disk fails because of excessive pressure in a vessel, or when the fluid flow rate increases above a predetermined amount, the plate 63 breaks along a line that either connects opposing ones of the slots 73–76, or otherwise breaks the electrical connection between petals 77 and 79 by way of radially extending scoreline segments 69–70 and end openings 71–72. This fracture of the plate 63 interrupts the flow of electricity between the terminals 64 and 65, breaking the circuit and activating the alarm 68.

In the embodiments of FIG. 7 and 11, each designated generally by the numeral 81, there is seen a sensor that is comprised of a plate 82 having a periphery 83. This plate 82 is generally circular in shape as shown. Plate 82 is divided into a pair of petals 84, 85, each being generally semicircular in shape. The petals 84, 85 are separated by enlarged radially extending slots 86, 87, each of which terminates before the two slots meet thereby leaving a bridge portion forming a weakened area connecting the two petals. In FIG. 7, the petal 84 provides a pair of radially extending scoreline segments 88 having openings 89 at the ends thereof. Petal 85 has diametrically opposed scoreline segments 90 with openings 91 at the ends. Scorelines 88 and 90 adjust the pressure point at which the plate 82 will rupture at the weakened area between petals 84 and 85. A pair of peripheral gaskets G are placed above and below the plate 82 as with the preferred embodiment in FIGS. 1–3. The gaskets G are preferably donut shaped or in the form of an annulus as with embodiment of FIGS. 1–3.

In FIG. 7, the terminals 94, 95 are attached to the periphery of petals 84 and 85. In FIG. 11, the terminals 94, 95 are tabs integrally formed with and extending from the petals 84, 85. A pair of electrical leads 92, 93 are attached to plate 82 at terminals 94, 95. Wire leads 92, 93 communicate with terminals on alarm 96 so that if the plate 82 breaks in half between slots 86, 87, the electrical circuit will be broken or interrupted and the alarm 96 can be sounded.

In the embodiment of FIGS. 9–10, an additional plate having an additional configuration is illustrated. FIG. 10 shows a sensor 97 only, without connecting wires and alarm. It should be understood that the embodiment of FIGS. 9–10 operates to activate an alarm when fractured by an excess pressure differential as with the aforedescribed embodiments of FIGS. 1–8. In FIGS. 9–10, sensor 97 includes a plate 98 with a plurality of equally spaced radially extending slots 99–104 extending inwardly from the periphery and separating the plate 98 into six pie or wedge-shaped petals. A pair of tabs 106–107 define terminals for attachment of electrical wire leads thereto. A central opening 105 is radially spaced from the inner ends of slots 99–104 as shown. In FIG. 9, an alternate sensor gasket provides a gasket sheet 108 having three radially extending and intersecting cuts 111–113 spaced inwardly of the gasket periphery 110. The cuts 111–113 intersect at center 114. An integrally attached tab 109 enables the gasket sheet 108 to electrically protect and reinforce a metallic plate such as plate 97 in FIG. 10 when used in combination therewith. Metallic sensor plate 97 is sandwiched between two gaskets 108, the gasket cuts 111–113 generally aligning with the slots 99–104 upon assembly. Upon assembly, central opening 105 aligns with gasket center 114. Any rupture of the plate 97 between slot 104 and center opening 105 and between any other slot 99–103 and the center opening 105 interrupts the electrical circuit.

FIGS. 12 and 13 illustrate generally a tenth embodiment of the apparatus of the present invention designated generally by the numeral 115. Sensor apparatus 115 includes a sensor body 116, preferably a conductive plate 117 (e.g., metallic) that can be flat or domed, and is preferably circular in shape.

Plate 117 includes an upper surface 118 and a lower surface 119. A pair of upper and lower, nonconducting gaskets G are affixed, respectively, to upper 118 and lower 119 surfaces of conductive plate 117 (FIG. 13). The nonconducting gaskets G are preferably donut or annular shaped, extending circumferentially around and coterminous with the periphery of conductive plate 117, extending a partial distance inwardly and radially as shown in FIGS. 12–13. It should be understood that FIG. 12 is a top view showing the gaskets G as applied to upper surface 118. The lower gasket 119 would be of a similar or identical size and shape, applied to lower surface 119 as shown in cross section in FIG. 13. All embodiments of FIGS. 1–8 and 11–13 preferably employ such a sandwich construction of a metallic sensor body plate placed between donut-shaped gaskets.

Conductive plate 117 is divided into a plurality of separate petal segments 120–125. The petals 120–125 are separated by radially extending scoreline segments 126, and slots 129. Each scoreline 126 has an opening 127–128, respectively, at the opposite end portions of the scoreline 126 (see FIG. 12). Scorelines 126 can be in the form of very small linear openings or can be scorelines etched in the plate 117 that do not fully penetrate the sensor plate 117. Radially extending slots 129 extend between scoreline openings 127 and the periphery of the conductive plate 117 as shown in FIG. 12.

Tab 130 can be formed integrally with conductive plate 117. Tab 130 can provide an enlarged end that is used for handling and manipulating the conductive plate 117 such as during assembly between a pair of pipe flanges in a sensor assembly holder. Both flanges and sensor assembly holders are commercially available structures that are usually metallic and known in the art. The gaskets G insulate the conductive plate 117 from such disk holder.

A pair of wire leads 131, 132 are shown extending from opposing petals 121 and 124 of conductive plate 117 at its periphery. Each of the wire leads 131, 132 communicates with an alarm 134 or other indicator, the wire leads 131, 132 attaching to alarm 134 at terminals 135, 136. The wire leads 131, 132 attach to the periphery of conductive sheet 117 at connections 137, 138. Again, any complete rupture between petals 121 and 124 will effectively open the circuit path and initiate alarm 134.

FIG. 14 is a general cross-sectional view of a dome-shaped sensor plate that could be any of the previous embodiments shown and discussed.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A sensing assembly for use in an enclosed fluid flow system for providing an immediate indication of a predetermined fluid flow pressure differential across said assembly, said sensing assembly comprising:

at least one infragmenting plate formed entirely of electrically conductive material;

at least a portion of said plate enabling said plate to be mounted in said fluid flow system;

first and second electrical terminals integrally formed with said plate, said first and second electrical terminals forming a closed electrical circuit path; and a weakened portion formed by cutout portion extending through the entire thickness of said plate in said closed electrical circuit path between said first and second terminals having a predetermined break strength for rupturing and opening said closed electrical circuit path if said fluid flow causes said predetermined pressure differential across said plate.

2. A sensing assembly as in claim 1 for use in a metallic portion of an enclosed fluid flow system further including:

insulating means for electrically insulating only one of said electrical terminals such that when said sensing assembly is used in said metallic portion of an enclosed fluid system, electrical contact between said only one electrical terminal and said metallic portion is prevented;

said other one of said electrical terminals being uninsulated so as to allow said closed electrical circuit path to be formed through the metallic portion when said sensing assembly is used in said metallic portion of said enclosed fluid flow system; and an alarm circuit coupled to said first and second electrical terminals such that when said closed electrical circuit path is opened by the rupturing of said weakened area, said alarm circuit provides an indication thereof.

3. A sensing assembly as in claim 2 wherein said weakened portion of said closed electrical circuit path further comprises at least one of said first and second electrical terminals having first and second portions with predetermined widths, said first portion being integrally formed with said plate, said first and second portions being connected by an integrally formed bridge portion with a smaller width than either said first or second portion to form said weakened bridge portion, the smaller width of the bridge portion determining the pressure differential across the plate necessary to rupture the bridge portion and open said closed electrical circuit.

4. A sensing assembly as in claim 3 further comprising:

said insulating means being first and second gaskets in the shape of an annulus with an inner and an outer diameter;

the inner diameter of each insulating gasket being sufficiently large to surround at least a portion of said plate in a spaced relationship;

a tab extending from said plate for enabling said plate to be mounted in operative relationship with said enclosed fluid flow system;

said first and second insulating gaskets clamping at least a portion of both said tab and said first and second electrical terminals between them to enable said plate to be subjected to a fluid pressure differential in said metallic portion of said fluid flow system in an electrically insulating relationship; and a portion of at least one of said gaskets extending inwardly from the inner diameter of said gasket to cover said weakened bridge portion such that upon rupture of the weakened bridge portion, said first portion of said at least one of said first and second terminals pulls inwardly and away from said bridge portion and moves upwardly, said plate being moved inwardly by said differential pressure and bending at said tab extension, said inwardly extending gasket portion preventing said first portion of said at least one of said first and second terminals from accidentally electrically reconnecting with said bridge portion of said at least one of said first and second terminals.

5. A sensing assembly as in claim 1 for use in a metallic portion of an enclosed fluid flow system further including said insulating means electrically of an enclosed fluid flow system further including said insulating means plate such that said sensing assembly can be used in said metallic portion of said enclosed fluid flow system without electrically contacting said metallic portion.

6. A sensing assembly as in claim 5 wherein said first and second electric terminals are parallel to and adjacent to each other.

7. A sensing assembly as in claim 1 for use in a metallic portion of said enclosed fluid flow system and further including:

insulating means for electrically insulating at least a portion of only one of said first and second electrical terminals to enable said sensing assembly to be used with said metallic portion of said enclosed fluid flow system;

electrical conducting means enabling the other one of said electrical terminals to electrically contact said metallic portion when used with said enclosed fluid flow system; and an alarm circuit coupled between said first and second electrical terminals for providing an alarm when said closed electrical circuit path is opened by said predetermined differential pressure across said plate.

8. A sensing assembly as in claim 1 further including:

said first and second electrical terminals being coupled to said electrically conductive plate diametrically opposite each other;

one of said first and second electrical terminals having first and second portions with predetermined widths, said first portion integrally formed with said plate, said first and second portions being connected by a bridge portion having a smaller width than said first and second portions to form said weakened portion, the smaller width of the bridge portion determining the pressure differential across the plate necessary to rupture the bridge portion and open said closed electrical circuit;

the other said electrical terminal forming a tab extending from said plate, said tab forming at least a portion of said plate to enable said sensing assembly to be mounted in said enclosed fluid flow system such that said plate can bend in relation to said tab and move away from said diametrically opposed one of said electrical terminals when its weakened bridge portion is ruptured so as to open said closed circuit.

9. A sensing assembly as in claim 6 further including:

first and second insulating gaskets of resilient material in the shape of an annulus with an inner and an outer diameter forming said insulating means;

the inner diameter of each insulating gasket being sufficiently large to surround at least a portion of said plate in a spaced relationship;

a tab extending from said plate and forming said at least first portion of said plate to enable said plate to be mounted in fluid pressure relationship in said enclosed fluid system; and said first and second insulating gaskets clamping at least a portion of both said tab and said first and second electrical terminals between them to enable said plate to be used in said metallic portion of said enclosed fluid flow system in an electrically insulating relationship.

10. A sensing assembly as claim 9 further including a projection on each of said gaskets, said projections extending over and sandwiching therebetween at least a portion of said first and second electrical terminals.

11. A sensing assembly as in claim 4 further including at least one orifice in said at least a portion of both said plate tab and said first and second electrical terminals such that said resilient insulating material, when clamped by insulating gaskets, enters said orifices and prevents said plate from slipping in relation to said insulating gaskets.

12. A sensing assembly as in claim 1 wherein said conductive plate comprises:

a conductive disk;

at least two spaced radial slots extending inwardly from the periphery of said disk and ending a first spaced distance from each other, said first spaced distance forming said weakened bridge portion that breaks or ruptures when said predetermined pressure differential occurs across said disk; and said first and second electrical terminals being coupled to the periphery of said disk on opposite sides of one of said at least two slots that extend inwardly from said periphery of said disk, said weakened bridge portion rupturing when said predetermined differential pressure occurs across said disk to open said electrical circuit path between said first and second electrical terminals.

13. A sensing assembly as in claim 12 further including:

a central opening in said disk; and said at least two spaced radial slots extending inwardly from said periphery of said disk and ending a second spaced distance from said central opening, said second spaced distance forming said weakened bridge portion.

14. A sensing assembly as in claim 12 further including four equally spaced slots extending inwardly from the periphery of said disk to form four quadrants, said slots ending said first spaced distance from each other.

15. A sensing assembly as in claim 14 wherein said first and second electrical terminals are coupled to said periphery of adjacent quadrants of said disk.

16. A sensing assembly as in claim 14 wherein said first and second electrical terminals are coupled to said periphery of diametrically opposing quadrants of said disk.

17. A sensing assembly as in claim 12 further including:

four unequally spaced slots extending inwardly from the periphery of said disk to form two sets of opposing petals of two different sizes;

a first set of petals having a first size and a second set of petals having a second size larger than said first set, said slots ending said first spaced distance from each other to form said weakened bridge portions;

said electrical terminals being connected to opposing ones of the first set of petals to form an electrical circuit path from one first size petal to the other; and first and second radially extending scoreline segments bisecting respective ones of said second set of petals to form said weakened bridge portions such that predetermined pressure differential across said disk breaks the electrical circuit path between said opposing petals to which said electrical connections are made.

18. A sensing element as in claim 12 further including said at least two slots forming first and second petals being diametrically opposed and joined together by said first spaced distance that forms said weakened bridge portion.

19. A sensing assembly as in claim 18 further including:

at least two radially extending scoreline segments in each of said first and second petals substantially equally spaced with respect to said at least two slots; and an opening at each end of each scoreline segment, said opening at the radially inward end of each scoreline segment being spaced substantially said first distance from each other and said at least two slots so as to enable said weakened bridge portion to rupture when a predetermined differential pressure occurs across said disk and to open said electrical circuit path between said first and second terminals.

20. A sensing assembly as in claim 12 further including:

an orifice in the center of said disk;

six substantially equally spaced slots extending radially inwardly from the periphery of said disk and ending said first spaced distance from each other and a second spaced distance from said orifice in the center of said disk to form six petals, said first and second spaced distances forming said weakened bridge portions that rupture when said predetermined differential pressure occur across said disk; and said first and second electrical terminals extending from first and second respective ones of said petals to form said closed electrical circuit path, said closed electrical circuit path being opened when at least some of said weakened areas are ruptured.

21. A sensing assembly as in claim 20 further including:

first and second insulating gaskets in superimposed relationship with each other;

said disk being sandwiched between said first and second gaskets in superimposed relationship; and each of said first and second insulating gaskets having three radially extending and intersecting cut lines in corresponding alignment with said slots, said cut lines allowing said gaskets to deform and allowing said weakened areas of said disk to rupture when differential pressure occurs.

22. A sensing assembly as in claim 20 further including:

first and second adjacent petals separated by one of said slots having said first and second electrical terminals connected thereto; and said one of said slots separating said first and second petals having a shorter second distance from said orifice in the center of said disk than the remaining slots.

23. A sensing assembly as in claim 17 further comprising:

said four substantially unequally spaced slots extending radially inwardly from the periphery of said metallic disk a predetermined distance to form said two sets of opposing petals of different sizes;

an additional scoreline segment continuing to extend radially inwardly from each slot and ending said first spaced distance from each other to form said weakened bridge areas in said metallic disk;

an orifice at each end of said scoreline segment to form additional weakened areas in said metallic disk; and said electrical terminals being connected to opposing ones of said first set of petals to form a closed circuit electrical path, said path being opened upon rupture of at least some of said weakened areas of said metallic disk when said predetermined differential pressure occurs across said disk.

24. A sensing assembly as in claim 1 wherein said at least one conductive plate is generally dome shaped in cross section.

25. A sensing assembly as in claim 1 wherein said at least one conductive plate is generally flat in cross section.

26. A sensor assembly for monitoring the fluid flow stream of a fluid containing vessel and providing immediate indication of a change in flow rate of said fluid stream, said assembly comprising:

a conductive disk having a first diameter and formed entirely of electrically conductive material;

a conductive mounting tab extending from said conductive disk for mounting said conductive disk in the fluid flow stream of said vessel;

at least one electrically conductive terminal having a first portion extending from said conductive disk and a second portion for providing a signal input, said first and second portions having a given width;

a bridge portion connecting said first and second electrical terminal portions and having a smaller width than said first and second portions to form an area of reduced strength for being ruptured when a predetermined fluid flow rate is exceeded;

said first and second electrical terminal portions, said bridge portion, said conductive disk, and said tab forming a closed electrical circuit;

insulating material in the form of first and second gaskets having the shape of an annulus and having an inside diameter and an outside diameter, said inside diameter being greater than said conductive disk diameter to allow said disk to bend about said extended tab when said bridge portion is ruptured but covering at least a portion of said conductive tab extension; and a support structure for mounting said disk to said fluid containing vessel in said fluid flow stream between said first and second insulating gaskets such that a predetermined change in fluid flow ruptures said bridge portion of said electrically conductive terminal and opens said closed electrical circuit to provide said indication.

* * * * *

UNITED STATES PATENT AND TRADEMARK OFFICE
CERTIFICATE OF CORRECTION

PATENT NO.  : 5,631,634
DATED       : May 20, 1997
INVENTOR(S) : Strelow

It is certified that error appears in the above-indentified patent and that said Letters Patent is hereby corrected as shown below:

Column 7, line 27, "infragmenting" should read
  --unfragmenting--.

Column 8, line 37, delete "of an enclosed fluid flow",
        line 38, delete "system further including said
  insulating means", and insert in place thereof --insulating
  both of said first and second electrical terminals and said--.

Column 11, line 24, delete "dosed" and insert in place
  thereof --closed--.

Signed and Sealed this

Sixteenth Day of December, 1997

Attest:

BRUCE LEHMAN

Attesting Officer

Commissioner of Patents and Trademarks